United States Patent
DiTommaso et al.

(10) Patent No.: US 6,668,234 B2
(45) Date of Patent: Dec. 23, 2003

(54) METHOD AND APPARATUS FOR CALCULATING THE AMPLITUDE OF A COMPLEX WAVEFORM ASSOCIATED WITH A ROTATING MACHINE SHAFT AFTER REMOVING THE RUNNING SPEED FREQUENCY

(75) Inventors: Anthony M. DiTommaso, Cranberry Township, PA (US); Kevin Dowdell, Pittsburgh, PA (US); Ljubisa Milojevic, Pittsburgh, PA (US)

(73) Assignee: ABB Inc., Norwalk, CT (US)

( * ) Notice: Subject to any disclaimer, the term of this patent is extended or adjusted under 35 U.S.C. 154(b) by 133 days.

(21) Appl. No.: 10/104,827

(22) Filed: Mar. 22, 2002

(65) Prior Publication Data

US 2003/0182071 A1 Sep. 25, 2003

(51) Int. Cl.[7] ............................................... G01R 13/00
(52) U.S. Cl. ........................................ 702/66; 702/56
(58) Field of Search .................... 702/66, 56; 324/177; 73/1.82

(56) References Cited

U.S. PATENT DOCUMENTS

| | | | | |
|---|---|---|---|---|
| 4,426,641 A | * | 1/1984 | Kurihara et al. | 340/683 |
| 5,115,671 A | * | 5/1992 | Hicho | 73/488 |
| 5,365,787 A | * | 11/1994 | Hernandez et al. | 73/660 |
| 5,501,105 A | * | 3/1996 | Hernandez et al. | 73/660 |
| 6,208,944 B1 | * | 3/2001 | Franke et al. | 702/56 |
| 6,456,945 B1 | * | 9/2002 | Sonnichsen et al. | 702/56 |
| 6,526,831 B2 | * | 3/2003 | Ben-Romdhane | 73/660 |
| 6,560,552 B2 | * | 5/2003 | Shen et al. | 702/56 |

* cited by examiner

*Primary Examiner*—Marc S. Hoff
*Assistant Examiner*—Anthony Gutierrez
(74) *Attorney, Agent, or Firm*—Michael M. Rickin

(57) ABSTRACT

A sampled data system for computing the amplitude of a signal received from a vibration sensing probe minus the fundamental frequency associated with the running speed of a rotating machinery shaft. This signal is known as the Not 1X waveform and variations in its amplitude can signal problems with bearings, rotors, cracks or mechanical looseness, and/or fluids of the rotating machine. The amplitude of the Not 1X waveform can be provided in either peak to peak amplitude, peak amplitude, absolute average or root mean square.

16 Claims, 5 Drawing Sheets

# METHOD AND APPARATUS FOR CALCULATING THE AMPLITUDE OF A COMPLEX WAVEFORM ASSOCIATED WITH A ROTATING MACHINE SHAFT AFTER REMOVING THE RUNNING SPEED FREQUENCY

FIELD OF THE INVENTION

This invention relates to rotating machines and more particularly to monitoring of the vibration of such machines.

DESCRIPTION OF THE PRIOR ART

In the realm of vibration monitoring of a rotating machine such as a turbine generator, it is sometimes desirable to know the amplitude of a signal received from a vibration sensing probe minus the fundamental frequency associated with the running speed of the rotating machinery shaft. This is known as the Not 1X waveform. Variations in the amplitude of this waveform could signal problems with bearings, rotors such as misalignment, cracks or mechanical looseness, and or fluids of the rotating machine.

The present invention describes a method implemented in conjunction with a sampled data system to compute the amplitude of the Not 1X waveform and provide the result in either peak to peak amplitude, peak amplitude, absolute average, or root mean square (RMS).

SUMMARY OF THE INVENTION

The present invention is a method for calculating the amplitude of a waveform associated with a rotating machine shaft after removing the fundamental frequency thereof. The method stores a predetermined percentage of samples of the waveform obtained at a predetermined sampling rate in a bin of data in a memory. The method further associates a speed of the shaft with each of the stored samples. The method also further determines the center frequency of a bandstop filter through which the samples stored in the memory data bin are passed by averaging the speed of the shaft associated with each of the stored samples. The method further accumulates a predetermined number of the stored samples starting with the first of the stored samples; and uses the accumulated stored samples to provide a data point that is free of any residual bias in the samples.

The present is also a method for calculating the amplitude of a waveform associated with a rotating machine shaft after removing the fundamental frequency thereof. The method stores a predetermined percentage of samples of the waveform obtained at a predetermined sampling rate in a bin of data in a memory. The method also associates a speed of the shaft with each of the stored samples. The method also further determines the center frequency of a bandstop filter through which the samples stored in the memory data bin are passed by averaging the speed of the shaft associated with each of the stored samples. The method further accumulates a predetermined number of the stored samples starting with the first of the stored samples; and calculates the average of the accumulated stored samples.

The present invention is further a method for calculating the amplitude of a waveform associated with a rotating machine shaft after removing the fundamental frequency thereof. The method samples the waveform at a predetermined sampling rate and stores a predetermined percentage of the samples in a bin of data in a memory. The method also associates a speed of the shaft with each of the stored samples and passes the samples stored in the memory data bin through a bandstop filter. The method also further determines the center frequency of the filter by averaging the speed of the shaft associated with each of the stored samples. The method further accumulates a predetermined number of the stored samples starting with the first of the stored samples; and calculates the average of the accumulated stored samples.

The present invention is further also a method for calculating the amplitude of a waveform associated with a rotating machine shaft after removing the fundamental frequency thereof. The method stores a predetermined percentage of samples of the waveform obtained at a predetermined sampling rate in a bin of data in a memory; and associates a speed of the shaft with each of the stored samples. The method also determines the center frequency of a bandstop filter through which the samples stored in the memory data bin are passed by averaging the speed of the shaft associated with each of the stored samples. The method further also accumulates in an accumulator a predetermined number of the stored samples starting with the first of the stored samples; and uses the accumulated stored samples to provide a data point that is free of any residual bias in the samples. The method further stores the accumulated value when the accumulated value is close to overflow; and sets the accumulator to zero.

The present is a system for calculating the amplitude of a waveform associated with a rotating machine shaft after removing the fundamental frequency thereof. The system has:
  a) means for storing a predetermined percentage of samples of the waveform obtained at a predetermined sampling rate in a bin of data in a memory;
  b) means for associating a speed of the shaft with each of the stored samples;
  c) means for determining the center frequency of a bandstop filter through which the samples stored in the memory data bin are passed by averaging the speed of the shaft associated with each of the stored samples;
  d) means for accumulating a predetermined number of the stored samples starting with the first of the stored samples; and
  e) means for using the accumulated stored samples to provide a data point that is free of any residual bias in the samples.

The present invention is also a system for calculating the amplitude of a waveform associated with a rotating machine shaft after removing the fundamental frequency thereof. The system has:
  a) a bin of data in a memory to store a predetermined percentage of samples of the waveform obtained at a predetermined sampling rate; and
  b) a computing device operative to:
    (i) associate a speed of the shaft with each of the stored samples;
    (ii) determine the center frequency of a bandstop filter through which the samples stored in the memory data bin are passed by averaging the speed of the shaft associated with each of the stored samples;
    (iii) accumulate a predetermined number of the stored samples starting with the first of the stored samples; and
    (iv) use the accumulated stored samples to provide a data point that is free of any residual bias in the samples.

DESCRIPTION OF THE PREFERRED EMBODIMENT(s)

Figure 1:
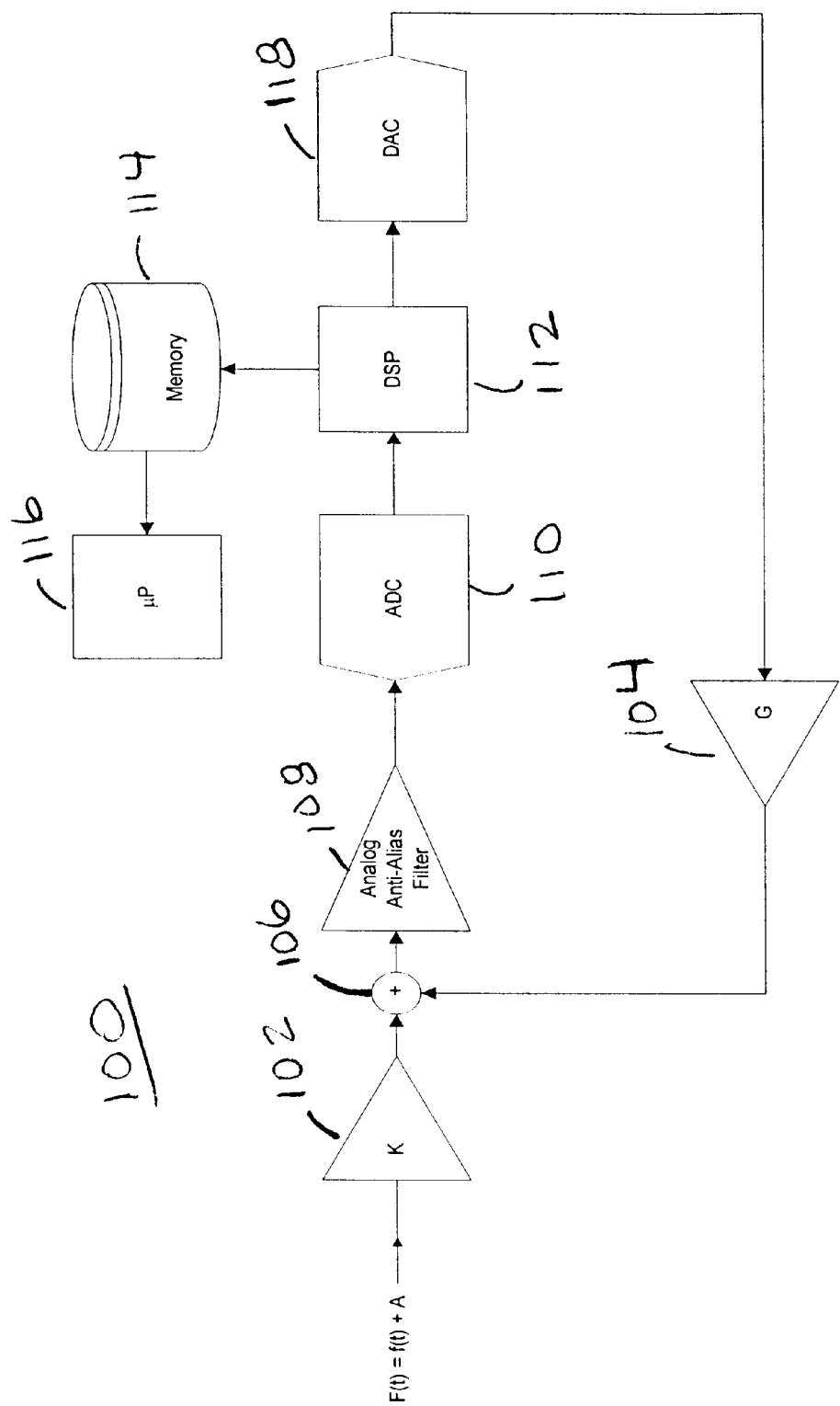
FIG. 1 shows a diagram for the digital processing unit in which the method of the invention is executed.

The method of the present invention is executed in a digital processing unit (DPU) 100 which is shown in FIG. 1. DPU 100 comprises analog operational amplifiers 102 and 104, a summer 106, an analog anti-alias filter 108, an analog to digital converter (ADC) 110, a digital signal processor (DSP) 112, memory 114, a microprocessor ($\mu$P) 116 and a digital to analog converter (DAC) 118. The output of DAC 118 is connected through analog amplifier 104 to one input of summer 106. The other input of summer 106 is connected to the output of analog amplifier 102.

The amplifier 102 and filter 108 function to condition the signal received at the input to DPU 100 from the vibration sensing probe (not shown) so as to maximize the information transmitted and to take advantage of as much of the resolution of ADC 110 as possible. Once the signal has been converted into digital form by ADC 110, the data stream is received and processed by the DSP 112 and the $\mu$P 116. One of the processes that is executed by DPU 100 is the method of the present invention.

In general, the method of the present invention, part of which is executed in DSP 112 and the remainder of which is executed in $\mu$P 116, conditions each data point and then, depending on the type of output value specified, that is, peak to peak amplitude, peak amplitude, absolute average, or root mean square, evaluates a number of data points in order to provide the appropriate result. Each data point is processed through a bandstop filter, with characteristics dependent on the speed of the shaft, then modified to remove average residual bias that may still be present. From there, procedures for calculating peak to peak amplitude, peak amplitude, absolute average, or root mean square are implemented in order to provide the appropriate output value.

Figure 2:
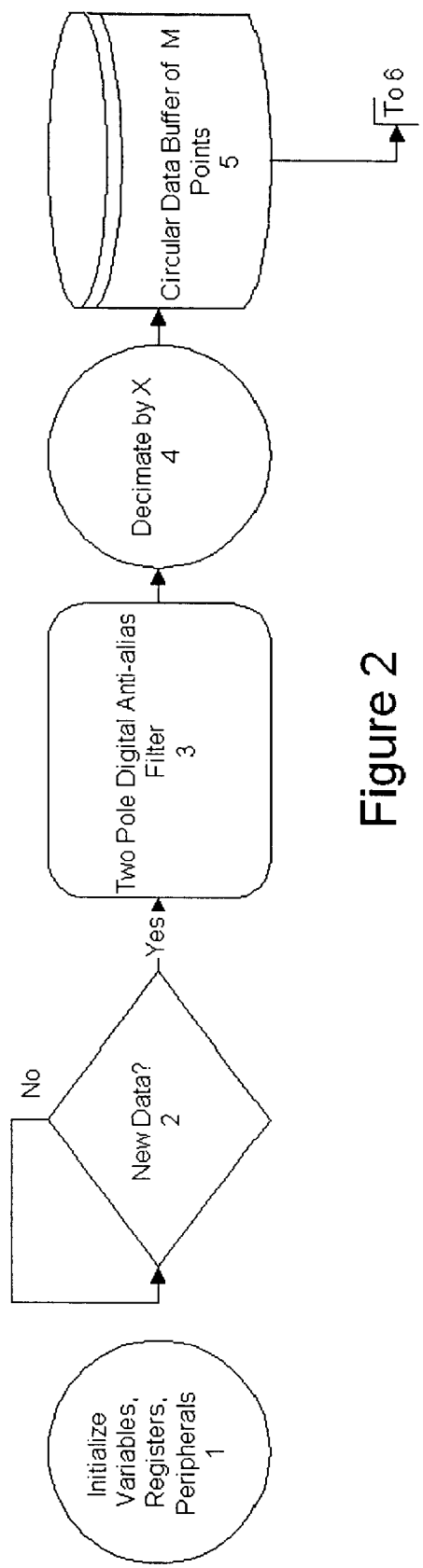
FIGS. 2–5 show a flow diagram for the method of the present invention.
Figure 3:
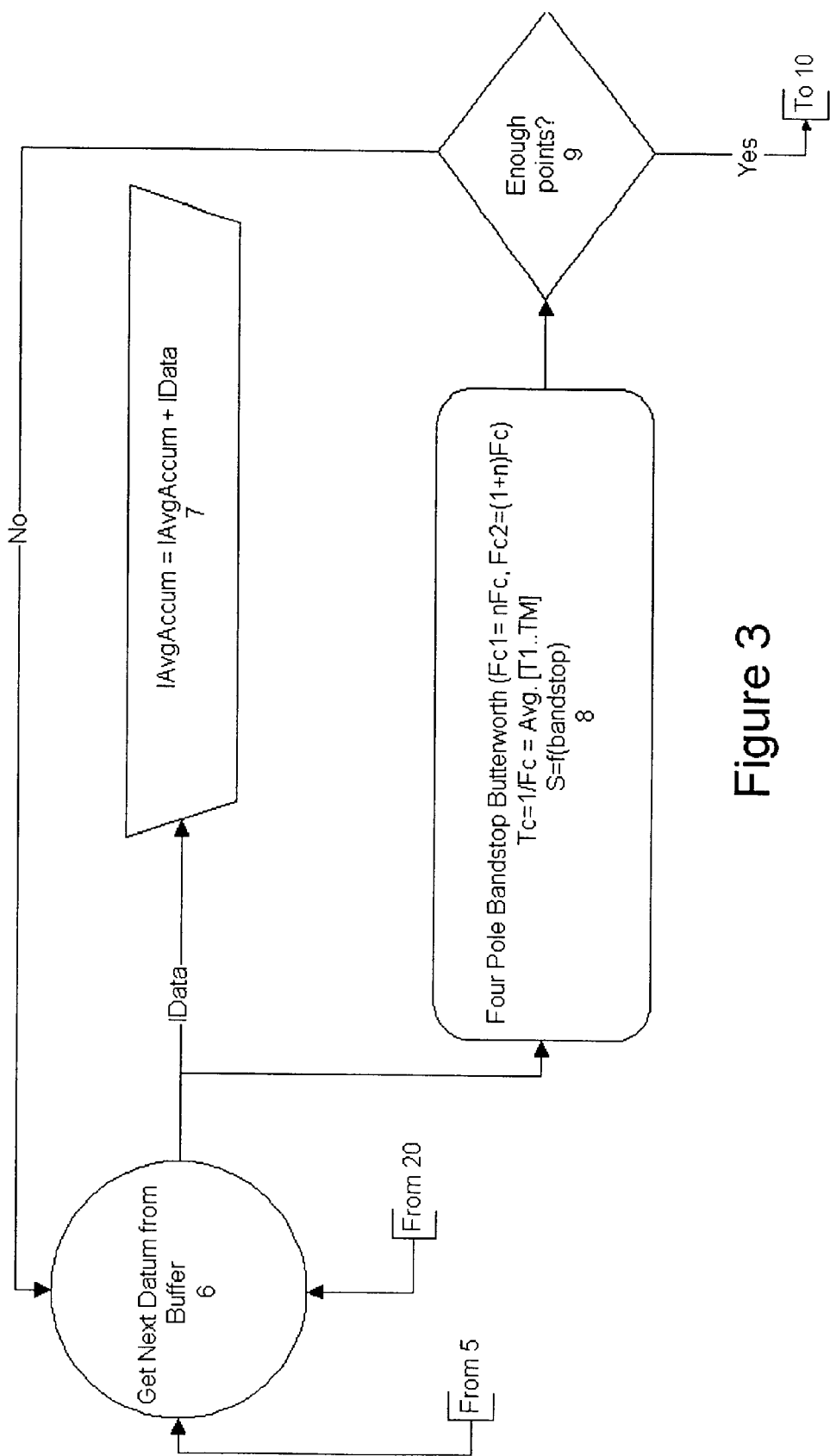
Figure 4:
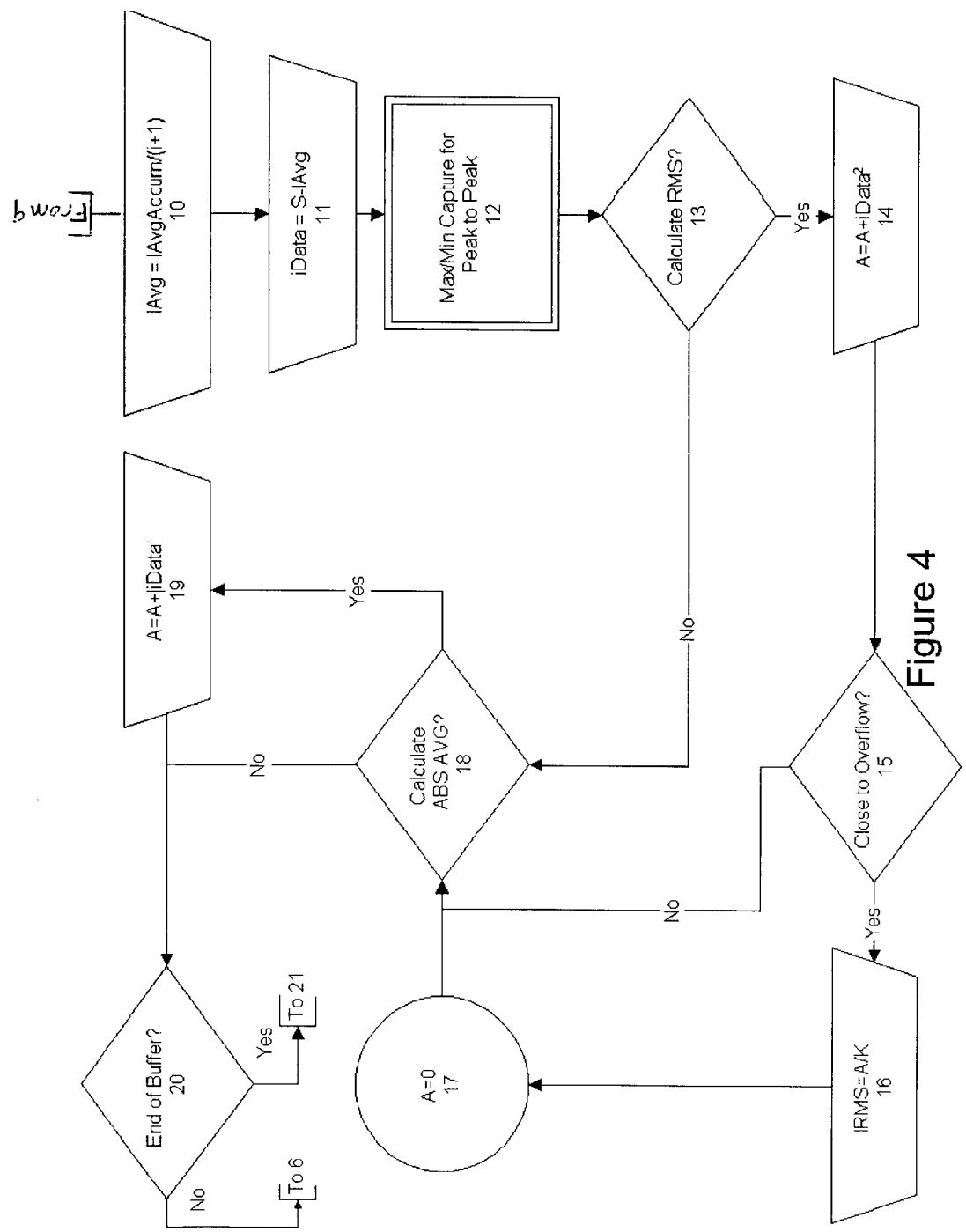
Figure 5:
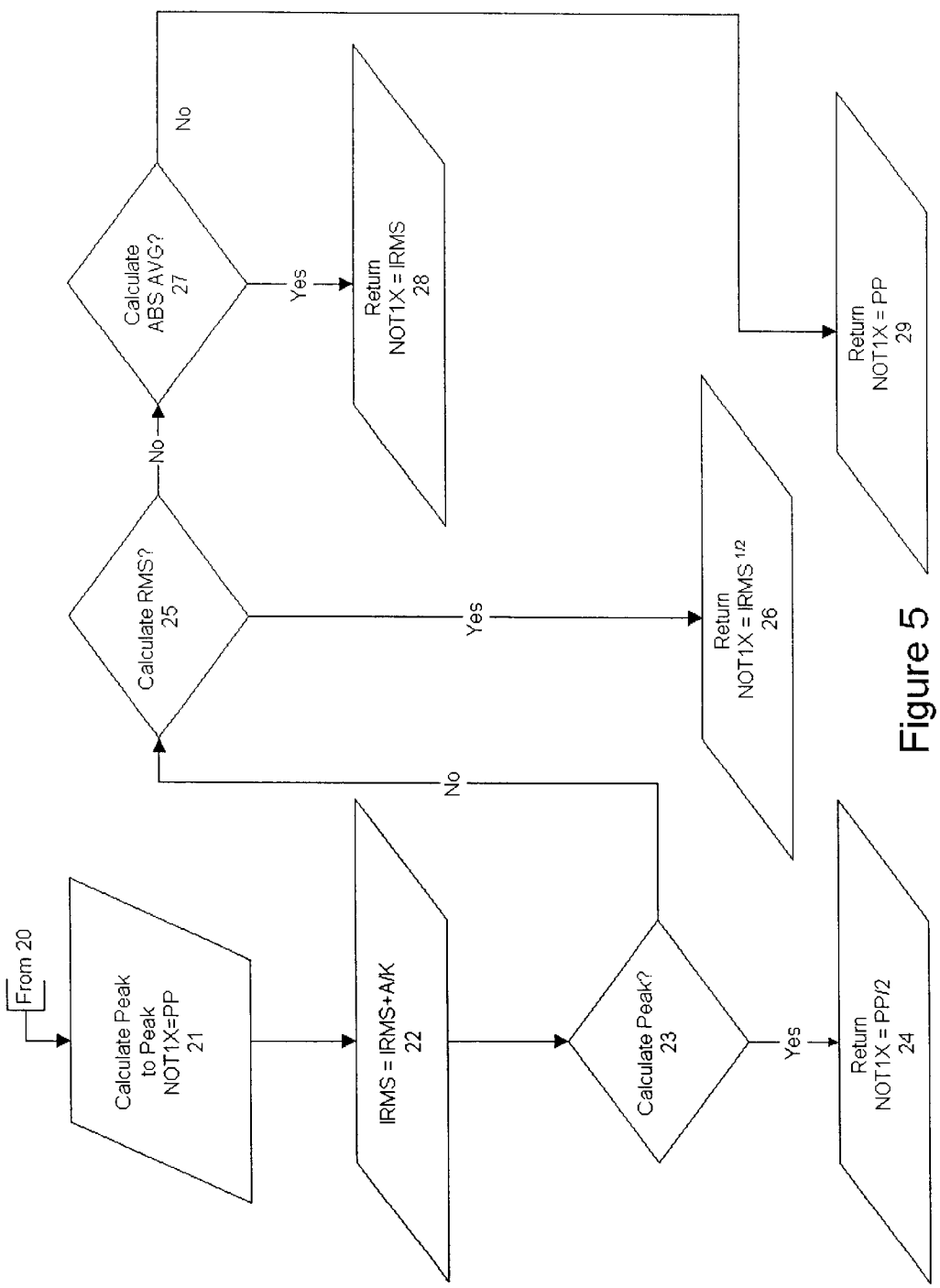

Referring now to FIGS. 2–5 there is shown a flow diagram for the method of the present invention. Blocks 1–5 are shown in FIG. 2, blocks 6–9 are shown in FIG. 3, blocks 10–20 are shown in FIG. 4 and FIG. 5 shows the remainder of the blocks (21–29) of the method. In one embodiment for the present invention blocks 1 to 5 of FIG. 2 are executed in DSP 112 and blocks 6 to 29 of FIGS. 3, 4 and 5 are executed in $\mu$P 116.

In block 1, the variables, registers and peripherals in DSP 112 are initialized. After such initialization a new data point is received. All of the calculations performed by DSP 112 on that new data point are completed prior to the receipt of the next data point.

Conditional 2 determines if a new data point has been received. If not the method waits until the receipt of the next data point. If a new data point has been received the method proceeds to block 3 where the new data point is conditioned through an anti-alias filter which is embodied in DSP 112.

The corner frequency of the filter in block 3 is determined with information about the running speed of the turbine. For example, if the turbine frequency is 60 Hz, then the corner frequency of the anti-alias filter would be 720 Hz. The corner frequency of the anti-alias filter is generally 12 times greater than the running speed of the turbine.

The method then proceeds to decimate in block 4. Decimation of the samples is performed so as to expand the frequency response of the method of the present invention through a useful range, namely, the speed profile of a turbine generator. When block 4 has determined that sufficient decimation has occurred the sample is accepted and placed by block 5 into memory 114. Otherwise, the sample is discarded.

The amount of decimation that occurs is based on the speed of the shaft and the need to capture a sufficient number of waveforms to accurately process the signal. In one embodiment for this method, the number of waveforms captured within memory 114 was 17. In order to capture this many waveforms based on a fixed sample rate of 10 Ksps, certain samples are rejected, while others are accepted. If the turbine frequency is 60 Hz, then the decimation rate would be 12. This means that for every 12 samples, only one is transferred to memory 114 for further use in the method.

As is shown in FIG. 3, each data point, that is, sample stored in the memory 114, is read in block 6 by $\mu$P 116 and placed in block 7 into an accumulator for the purpose of calculating an average value. This value is used to remove any residual bias that may remain among the points in the memory 114. Each point read from memory 114 is also passed in block 8 through a bandstop filter.

The filter of block 8 is of a multi-pole Butterworth bandstop design with corner frequencies a percentage away from the center frequency, allowing transition of the output value. The center frequency is determined by averaging the speed of the turbine shaft associated with each data point in the circular bin of data that is in memory 114. The association of speed to data is made at the time when the value is acquired. The time indices from which speed is calculated are provided through another part of memory that could be physically together or separate from the circular bin of data in memory 114.

The Butterworth filter used in the method of the present invention is an infinite impulse response (IIR) filter. The IIR type was selected for its reduced number of coefficients as compared to a finite impulse response (FIR) filter. The selection of the filter type is important when considering that the response time of the output value of the method is directly influenced by the number of coefficients that need to be calculated for a changing filter. The difference in time required to compute a filter output with an IIR type filter is an order of magnitude less than it would be if the Butterworth filter was embodied as an FIR type filter.

Furthermore, and as is described above, the center frequency of the filter can change based on the speed of the turbine shaft. This means that when the center frequency changes, all coefficients associated with the filter need to be recalculated. The coefficients calculated for the IIR filter utilize one of a class of Foster reactance functions as well as Geffe's algorithm to obtain equations that transform bilinearly into a format whereby useful numbers can be obtained. Because of the complexity associated with this process, it is likely that regenerating coefficients associated with a FIR filter possessing a similar response to the IIR filter would take more time. This would cause additional taxing of the finite resources available and thus may disqualify the FIR filter from further consideration for use in the method of the present invention.

When block 9 determines from the output of the filter of block 8 that a sufficient number of data points have been read from the memory 114, the method of the present invention proceeds to the computation in block 10 (see FIG. 4). Block 10 uses the data points placed into the accumulator by block 7 to compute the average of those data points for the purpose of removing any remaining bias. The point where block 9 of the method determines that a sufficient number of points have been read has more to do with the number of points required to complete block 10 rather than the necessary number of points to achieve an accurate value for the average. Through empirical data, it was determined that the preceding blocks of the invention provided the best results when they acted on the latter one-third of the data collected in the memory 114.

For this reason, it was sufficient and simpler in block 11 to calculate for the purpose of removing residual bias an average based on the first two thirds of the data collected. If the average value was based on the entire data collected in the memory, then the method would need to wait until all points were examined before the computed average was utilized. In this method, the average is calculated for use at the time the last one third of data is ready to be processed. The variable S that is used in block 11 is obtained from block 8.

With the bias adjusted value recently received from the bandstop filter, the data point is checked in block 12 to see if it qualifies as a new maximum or minimum value. This function is performed in the event that the user requests the output of data in the form of peak to peak amplitude. Once that determination is made, the method checks in block 13 to see if the user of the method has requested RMS.

If RMS is requested, then the data point, iData that is calculated in block 11, is in block 14 squared and accumulated with previously squared values to give an accumulated value A. If block 15 determines that the accumulated value A of block 14 is close to overflow, then the accumulated value A of block 14 is divided in block 16 by the total number of points K used for this calculation. The accumulated value A is then in block 17 reset to zero and the method proceeds to determine in block 18 whether or not the user has requested to calculate absolute average.

If block 15 determines that the accumulated value is not close to overflow, then the program flow proceeds directly from block 15 to block 18. The program flow would proceed directly from block 13 to block 18 in the event that block 13 determined that RMS was not to be calculated.

If block 18 determines that the absolute average is to be calculated, then in block 19 the absolute value of the bias adjusted data point is added to an accumulation of like values. The variable iData used in block 19 is obtained from block 11. If block 20 determines that the progression through the circular data buffer is such that the end of the buffer has been reached, then the block 21 (see FIG. 5) calculates the peak to peak amplitude with the values calculated during the maximum and minimum determination process of block 12. If block 20 determines that the end of the buffer has not been reached, then the method returns to block 6 (see FIG. 3) to read the next data point from memory 114 and a new data point is extracted from the memory and the blocks described above are executed again.

After block 21 has calculated the peak to peak amplitude, then the accumulated values for RMS or the accumulated value for absolute average are assigned in block 22 to a new variable. In making that calculation block 22 uses the variable IRMS calculated in block 16 and the variable A calculated in block 19.

Since either RMS or absolute average are selected, but not both at the same time, block 22 needs to be able to accommodate either preference. In the case of RMS, the possibility of partial sums due to overflow compensation needs to be considered. In the case of absolute average, the method does not leave open the possibility for overflow during this option. In the case of RMS, the total number of points used in the calculation divides the last accumulator. In the case of absolute average, the total number of points used in the calculation divides the only accumulator used.

After the partial summation by block 22 for either the RMS or absolute average calculation, the method determines in block 23 if it is necessary to calculate the peak amplitude instead of the peak to peak amplitude of the Not 1X waveform. If so, then the value returned in block 24 as Not 1X is one half of the peak to peak value calculated in block 21. If not, then the method determines in block 25 if it is necessary to calculate RMS. If so, then in block 26 the value returned is the square root of the sum of partial sums. If not, then the method determines in block 27 if it is necessary to calculate absolute average. If so, then in block 28 the value returned is the sum of the partial sums. If not, then in block 29 the value returned is the peak to peak amplitude calculated earlier.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for calculating the amplitude of a waveform associated with a rotating machine shaft after removing the fundamental frequency thereof comprising:
    a) storing a predetermined percentage of samples of said waveform obtained at a predetermined sampling rate in a bin of data in a memory;
    b) associating a speed of said shaft with each of said stored samples;
    c) determining the center frequency of a bandstop filter through which said samples stored in said memory data bin are passed by averaging the speed of said shaft associated with each of said stored samples;
    d) accumulating a predetermined number of said stored samples starting with the first of said stored samples; and
    e) using said accumulated stored samples to provide a data point that is free of any residual bias in said samples.

2. The method of claim 1 wherein said bandstop filter is an infinite impulse response filter.

3. The method of claim 1 wherein said predetermined number of said accumulated stored samples is about two-thirds of said samples stored in said bin of memory.

4. A method for calculating the amplitude of a waveform associated with a rotating machine shaft after removing the fundamental frequency thereof comprising:
    a) storing a predetermined percentage of samples of said waveform obtained at a predetermined sampling rate in a bin of data in a memory;
    b) associating a speed of said shaft with each of said stored samples;
    c) determining the center frequency of a bandstop filter through which said samples stored in said memory data bin are passed by averaging the speed of said shaft associated with each of said stored samples;
    d) accumulating a predetermined number of said stored samples starting with the first of said stored samples; and
    e) calculating the average of said accumulated stored samples.

5. The method of claim 4 wherein said bandstop filter is an infinite impulse response filter.

6. The method of claim 4 wherein said predetermined number of said accumulated stored samples is about two-thirds of said samples stored in said bin of memory.

7. A method for calculating the amplitude of a waveform associated with a rotating machine shaft after removing the fundamental frequency thereof comprising:
   a) sampling said waveform at a predetermined sampling rate;
   b) storing a predetermined percentage of said samples in a bin of data in a memory;
   c) associating a speed of said shaft with each of said stored samples;
   d) passing said samples stored in said memory data bin through a bandstop filter;
   e) determining the center frequency of said filter by averaging the speed of said shaft associated with each of said stored samples;
   f) accumulating a predetermined number of said stored samples starting with the first of said stored samples; and
   g) calculating the average of said accumulated stored samples.

8. The method of claim 7 wherein said bandstop filter is an infinite impulse response filter.

9. The method of claim 8 wherein said infinite impulse response filter is a multi-pole Butterworth filter.

10. The method of claim 7 wherein said predetermined number of said accumulated stored samples is about two-thirds of said samples stored in said bin of memory.

11. The method of claim 7 wherein said average is calculated when the total number of stored samples less said predetermined number of said stored samples starting with the first of said stored samples is ready for processing.

12. A method for calculating the amplitude of a waveform associated with a rotating machine shaft after removing the fundamental frequency thereof comprising:
   a) storing a predetermined percentage of samples of said waveform obtained at a predetermined sampling rate in a bin of data in a memory;
   b) associating a speed of said shaft with each of said stored samples;
   c) determining the center frequency of a bandstop filter through which said samples stored in said memory data bin are passed by averaging the speed of said shaft associated with each of said stored samples;
   d) accumulating in an accumulator a predetermined number of said stored samples starting with the first of said stored samples;
   e) using said accumulated stored samples to provide a data point that is free of any residual bias in said samples;
   f) storing said accumulated value when said accumulated value is close to overflow; and
   g) setting said accumulator to zero.

13. The method of claim 12 wherein said method comprises the step of determining if an accumulated value of said data point is close to overflow occurs when said amplitude is to be provided as the root mean square prior to said step of storing said accumulated value.

14. The method of claim 12 wherein said step of storing said accumulated value occurs when said amplitude is to be provided as the root mean square.

15. A system for calculating the amplitude of a waveform associated with a rotating machine shaft after removing the fundamental frequency thereof comprising:
   a) means for storing a predetermined percentage of samples of said waveform obtained at a predetermined sampling rate in a bin of data in a memory;
   b) means for associating a speed of said shaft with each of said stored samples;
   c) means for determining the center frequency of a bandstop filter through which said samples stored in said memory data bin are passed by averaging the speed of said shaft associated with each of said stored samples;
   d) means for accumulating a predetermined number of said stored samples starting with the first of said stored samples; and
   e) means for using said accumulated stored samples to provide a data point that is free of any residual bias in said samples.

16. A system for calculating the amplitude of a waveform associated with a rotating machine shaft after removing the fundamental frequency thereof comprising:
   a) a bin of data in a memory to store a predetermined percentage of samples of said waveform obtained at a predetermined sampling rate; and
   b) a computing device operative to:
      (i) associate a speed of said shaft with each of said stored samples;
      (ii) determine the center frequency of a bandstop filter through which said samples stored in said memory data bin are passed by averaging the speed of said shaft associated with each of said stored samples;
      (iii) accumulate a predetermined number of said stored samples starting with the first of said stored samples; and
      (iv) use said accumulated stored samples to provide a data point that is free of any residual bias in said samples.

* * * * *